United States Patent
Wu

(10) Patent No.: US 8,465,839 B2
(45) Date of Patent: *Jun. 18, 2013

(54) POLYIMIDE POLYBENZIMIDAZOLE INTERMEDIATE TRANSFER MEMBERS

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/214,498

(22) Filed: Aug. 22, 2011

(65) Prior Publication Data

US 2013/0052375 A1 Feb. 28, 2013

(51) Int. Cl.
*B32B 27/08* (2006.01)
*B32B 27/20* (2006.01)
*B32B 27/34* (2006.01)
*G03G 15/16* (2006.01)

(52) U.S. Cl.
USPC ........ 428/421; 428/422; 428/447; 428/473.5; 399/308

(58) Field of Classification Search
None
See application file for complete search history.

(56) References Cited

U.S. PATENT DOCUMENTS

| | | | | |
|---|---|---|---|---|
| 4,973,629 | A | * | 11/1990 | Williams et al. ............... 525/432 |
| 5,922,440 | A | * | 7/1999 | Schlueter et al. .......... 428/195.1 |
| 5,978,639 | A | | 11/1999 | Masuda et al. |
| 6,139,784 | A | | 10/2000 | Oshima et al. |
| 6,397,034 | B1 | | 5/2002 | Tarnawskj et al. |
| 7,031,647 | B2 | | 4/2006 | Mishra et al. |
| 7,130,569 | B2 | | 10/2006 | Goodman et al. |
| 7,139,519 | B2 | | 11/2006 | Darcy, III et al. |
| 8,252,420 | B2 | * | 8/2012 | Wu et al. ........................ 428/421 |
| 2005/0045856 | A1 | * | 3/2005 | Yoshikawa et al. ........... 252/500 |
| 2012/0183783 | A1 | * | 7/2012 | Wu et al. ....................... 428/422 |

* cited by examiner

*Primary Examiner* — Ramsey Zacharia
(74) *Attorney, Agent, or Firm* — Eugene O. Palazzo

(57) ABSTRACT

An intermediate transfer member that includes a mixture of a thermoplastic polyimide, a polybenzimidazole, and an optional conductive filler.

18 Claims, 1 Drawing Sheet

POLYIMIDE POLYBENZIMIDAZOLE INTERMEDIATE TRANSFER MEMBERS

This disclosure is generally directed to an intermediate transfer member that includes a polyimide, a polybenzimidazole, and an optional conductive component.

BACKGROUND

A number of intermediate transfer members, such as intermediate transfer belts selected for transferring a developed image in xerographic systems, are known. For example, there are known intermediate transfer belts that contain thermosetting polyimides. The thermosetting polyimides can be costly, especially because such imides are usually subjected to curing by heating at temperatures equal to or exceeding 300° C. for extended time periods.

Also known are intermediate transfer members that include materials with characteristics that cause these members to become brittle, resulting in inadequate acceptance of the developed image, and subsequent partial transfer of developed xerographic images to a substrate like paper.

Other disadvantages that may be associated with several known intermediate transfer members relate to an unsuitable stable resistivity, and poor break strengths resulting in degradation of the developed xerographic image to be transferred from the member.

Intermediate transfer members may provide a number of advantages, such as enabling high throughput at modest xerographic machine process speeds; and improving registration of the final color toner image in color systems using synchronous development of one or more component colors with one or more transfer stations.

However, an intermediate transfer member disadvantage is that a plurality of transfer steps is usually needed, allowing for the possibility of charge exchange occurring between toner particles and the transfer member, which ultimately can lead to less than complete toner transfer, resulting in low resolution of images on the image receiving substrate and image deterioration, undesirable color shifting and color deterioration.

Attempts at controlling the resistivity of intermediate transfer members have been accomplished by, for example, adding conductive fillers such as ionic additives and/or carbon black to the outer layer of the member. However, there are problems associated with the use of such additives. In particular, undissolved additive particles frequently bloom or migrate to the surface of the polymer and cause an imperfection in the polymer. This leads to nonuniform resistivity, which in turn causes poor antistatic properties and poor mechanical strength.

Also, the ionic additives formed on the surface of the transfer member may interfere with toner release. Furthermore, bubbles may appear in the intermediate transfer member conductive polymer, some of which can only be seen with the aid of a microscope, others of which are large enough to be observed with the naked eye. These bubbles cause poor or nonuniform electrical properties and poor mechanical properties. In addition, the ionic additives themselves are sensitive to changes in temperature, humidity, and operating time. These sensitivities often limit the resistivity range. For example, the resistivity usually decreases by up to two orders of magnitude, or more as the humidity increases from about 20 to about 80 percent relative humidity, when ionic additives are present in intermediate transfer members.

There is a need for intermediate transfer members that substantially avoid or minimize the disadvantages of a number of known intermediate transfer members.

Also, there is a need for intermediate transfer member materials that have a high glass transition temperature ($T_g$), and which materials have minimal brittleness.

Further, there is a need for intermediate transfer members with components that can be economically and efficiently manufactured with acceptable curing times.

There is also a need for intermediate transfer members that exhibit a desirable coefficient of thermal expansion, have acceptable modulus, and possess excellent transfer capabilities.

Moreover, there is a need for intermediate transfer members with excellent wear, desirable break strengths, and acceptable abrasion resistance.

These and other needs are achievable in embodiments with the intermediate transfer members and components thereof disclosed herein.

SUMMARY

Disclosed is an intermediate transfer member comprising a mixture of a thermoplastic polyimide and a polybenzimidazole.

Also, disclosed hereinis an intermediate transfer member comprising a polymer layer comprising a mixture of a thermoplastic polyimide and a polybenzimidazole, wherein the thermoplastic polyimide is selected from the group consisting of those represented by the following formulas/structures

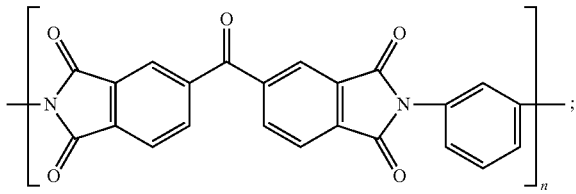

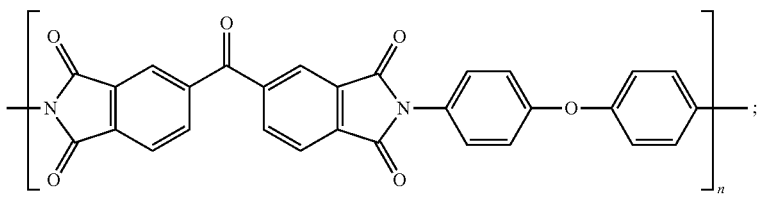

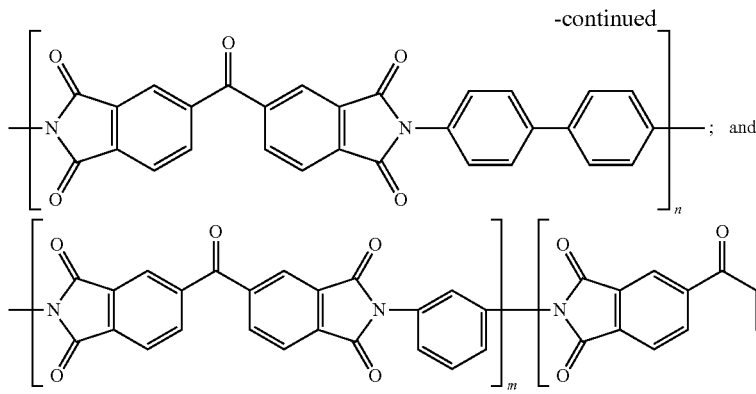

wherein each n and m represents the number of repeating units of from about 50 to about 2,000; and wherein the polybenzimidazole is represented by the following formulas/structures

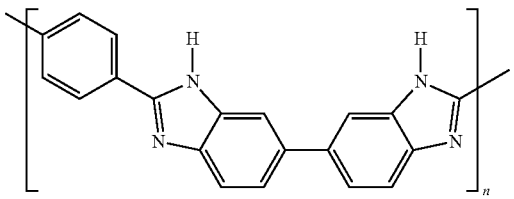

wherein n represents the number of repeating segments of from about 30 to about 500.

Further, there is disclosed an abrasion resistant intermediate transfer member comprised of a mixture of a thermoplastic polyimide, a polybenzimidazole, and an optional conductive filler, and wherein the member possesses a Young's Modulus of from about 3,500 to about 6,500 Mega Pascals and a coefficient of thermal expansion of from about 25 ppm/K to about 55 ppm/K.

FIGURES

The following Figures are provided to further illustrate the intermediate transfer members disclosed herein.

EMBODIMENTS

There is provided herein an intermediate transfer member comprising an optional supporting substrate, and thereover a polymer layer comprising a mixture of a polyimide and a polybenzimidazole.

Figure 1:
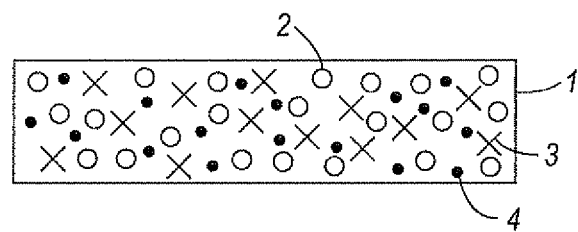
FIG. 1 illustrates an exemplary embodiment of a one-layer intermediate transfer member of the present disclosure.

In FIG. 1 there is illustrated a one-layer intermediate transfer member comprising a polymer layer 1, comprising a mixture of a polyimide 2, a polybenzimidazole 3, and an optional conductive component or filler like carbon black 4.

Figure 2:
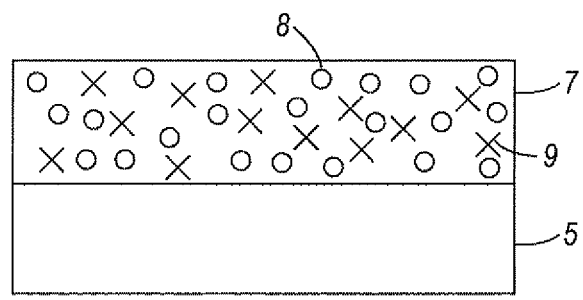
FIG. 2 illustrates an exemplary embodiment of a two-layer intermediate transfer member of the present disclosure.

In FIG. 2 there is illustrated a two-layer intermediate transfer member comprising an optional supporting substrate polymeric layer 5, and a layer 7, comprising a mixture of a polyimide 8, and a polybenzimidazole 9.

Figure 3:
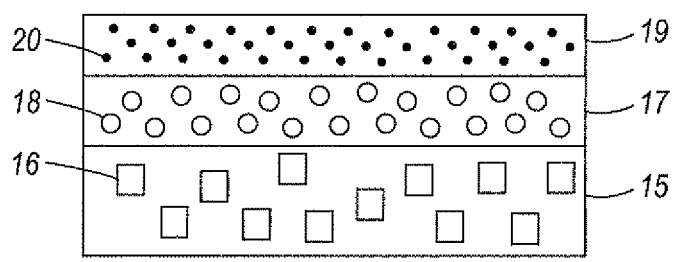
FIG. 3 illustrates an exemplary embodiment of a three-layer intermediate transfer member of the present disclosure.

In FIG. 3 there is illustrated a three-layer intermediate transfer member comprising an optional supporting substrate 15, comprising an optional filler 16, dispersed therein, a polymeric layer 17, comprising a mixture 18, of a polyimide and a polybenzimidazole, and an optional release layer 19, containing release components 20.

There is disclosed an intermediate transfer member that generally comprises a blend or mixture of a polyimide, a polybenzimidazole, and optionally a conductive component like carbon black. The mixture of the polyimide and a polybenzimidazole provides an intermediate transfer member that exhibits properties superior to or similar to a conventional intermediate transfer member formed with more costly thermosetting polyimides.

The disclosed intermediate transfer member comprising a mixture of the polyimide and the polybenzimidazole generally exhibits an excellent functional resistivity; a high Young's modulus of, for example, from about 3,000 to about 8,500 Mega Pascals (MPa), from about 3,500 to about 8,000 (MPa), or from about 3,500 to about 6,500 MPa; a high glass transition temperature ($T_g$) of, for example, from about 250° C. to about 400° C., from about 380° C. to about 420° C., or from about 320° C. to about 375° C.; and an excellent coefficient of thermal expansion (CTE) of from about 15 to about 70 ppm/K (parts per million per degree Kelvin), from about 15 to about 55, from about 25 to about 55, or from about 30 to about 50 ppm/K.

The single layered or multi-layered intermediate transfer members disclosed herein generally possess, in addition to reduced curing times of 1 to 2 hours for the components of the members, an excellent resistivity as measured with a known High Resistivity Meter of, for example, from about $10^8$ to about $10^{13}$ ohm/square, or from about $10^9$ to about $10^{12}$ ohm/square, or from about $10^{10}$ to about $10^{11}$ ohm/square, and acceptable wear and abrasion resistance characteristics.

The intermediate transfer members disclosed herein can be provided in any of a variety of configurations, such as a one-layer configuration, or in a multi-layer configuration including, for example, a supporting substrate and/or a release layer. The final intermediate transfer member may be in the form of an endless flexible belt, a web, a flexible drum or roller, a rigid roller or cylinder, a sheet, a drelt (a cross between a drum and a belt), and the like.

Polyimide

The polyimide utilized for the preparation of the disclosed intermediate transfer members can be a polyimide homopolymer, a polyimide copolymer, a higher order polyimide polymer, or mixtures thereof. For example, the intermediate transfer member thermoplastic polyimides, available from HP Polymers Incorporated, can be represented by the following formulas/structures

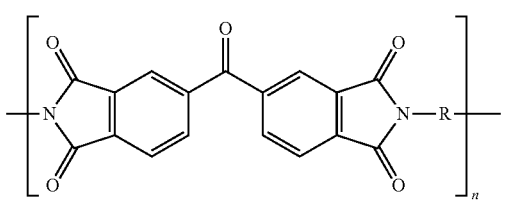

where R is aryl or substituted derivatives thereof with, for example, from about 6 to about 36 carbon atoms, from about 6 to about 24 carbon atoms, from about 6 to about 12 carbon atoms, or from about 12 to about 24 carbon atoms, and n represents the number of repeating units or segments. For example, n can be a number of from about 50 to about 2,000, from about 100 to about 1,000, from about 275 to about 700, from about 400 to about 600, or from about 150 to about 400.

Examples of specific suitable thermoplastic polyimides selected for the generation of the disclosed intermediate transfer members include those represented by the following formulas/structures

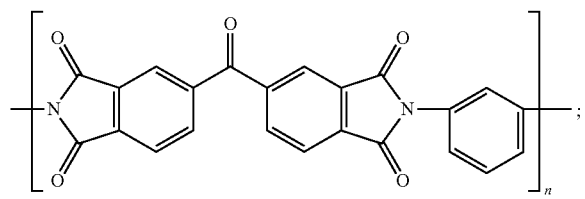

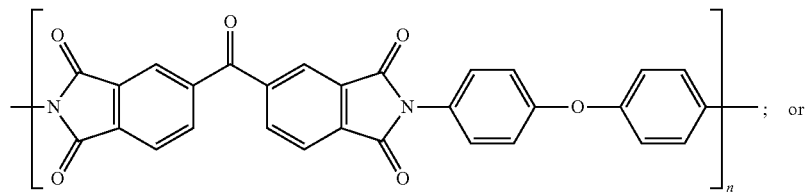

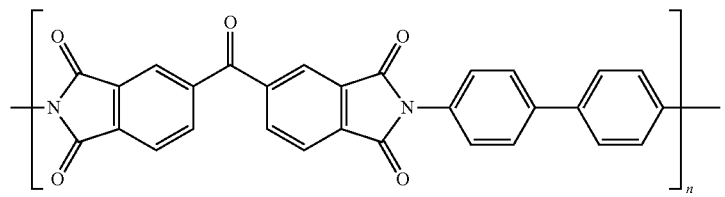

where n is a number as illustrated herein, or, for example, from about 50 to about 2,000, from about 100 to about 1,000, from about 275 to about 450, or from about 100 to about 375.

Thermoplastic polyimide copolymer examples that can be selected for the disclosed intermediate transfer members are represented by the following formulas/structures where each n and m represents the repeating unit or segment of from about 50 to about 2,000, or from about 100 to about 1,000.

The number average molecular weight of the disclosed intermediate transfer member thermoplastic polyimides can be, for example, from about 5,000 to about 50,000, from about 10,000 to about 35,000, from about 10,000 to about 25,000, or from about 15,000 to about 25,000, and the weight average molecular weight of the polyimide can be, for example, from about 10,000 to about 300,000, from about 10,000 to 200,000, from about 20,000 to about 150,000, or from about 50,000 to about 100,000, where the weight average molecular weights and number average molecular weights are determined by known methods, such as GPC analysis.

Glass transition temperatures, as determined by known DSC analysis of the intermediate transfer member polyimides illustrated herein, are, for example, from about 275° C. to about 335° C., from about 275° C. to about 315° C., or from about 290° C. to about 305° C.

Polybenzimidazoles

The disclosed intermediate transfer members also include a polybenzimidazole that is blended with or mixed with the polyimide. As the intermediate transfer member polybenzimidazole any suitable polybenzimidazole, or mixture of two, three, or more different polybenzimidazoles can be selected.

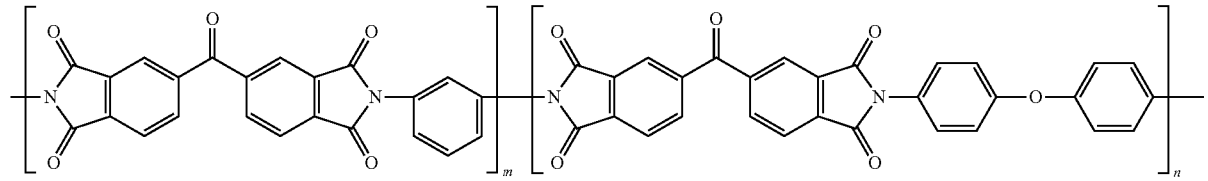

Examples of suitable polybenzimidazoles (PBI) that can be selected for the disclosed intermediate transfer member mixtures are represented by the following formulas/structures

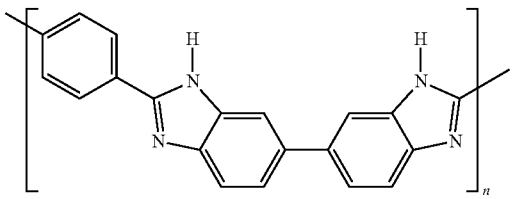

where n is, for example, a number of from about 10 to about 800, from about 30 to about 700, from about 30 to about 625, from about 30 to about 500, from about 100 to about 400, from about 100 to about 300, from about 200 to about 300, or from about 200 to about 700.

Commercially available polybenzimidazoles (PBI) are obtainable from Boedeker Plastics, inc., Shiner, Tex. under the trade name of CELAZOLE®, and include, for example, a 26 weight percent PBI solution in N,N'-dimethylacetamide (DMAc).

It is believed that the polybenzimidazoles can be prepared in accordance with the following reaction scheme where the value of n is as illustrated herein

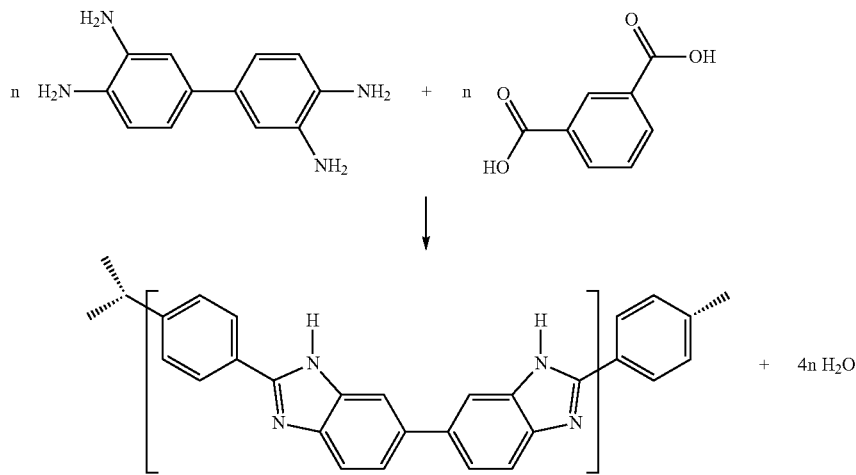

The number average molecular weight of the polybenzimidazole can be, for example, from about 2,000 to about 40,000, from about 3,000 to about 40,000, from about 10,000 to about 25,000, from about 5,000 to about 20,000, from about 9,000 to about 15,000, or from about 7,000 to about 15,000, and the weight average molecular weight of the polybenzimidazole can be, for example, from about 9,000 to about 150,000, from about 30,000 to about 120,000, from about 20,000 to about 120,000, from about 50,000 to about 100,000, or from about 60,000 to about 90,000 with the weight and number average molecular weight being determined by known methods, such as GPC analysis.

The glass transition temperature ($T_g$) of the polybenzimidazoles as determined by known DSC analysiscan be, for example, from about 390° C. to about 420° C., from about 400° C. to about 415° C., from about 380° C. to about 420° C., or from about 395° C. to about 410° C.

For the disclosed intermediate transfer blended mixture of the polyimide and the polybenzimidazole, the polyimide can be present in an amount of from about 1 to about 99 weight percent, from about 1 to about 95 weight percent, from about 25 to about 75 weight percent, from about 40 to about 60 weight percent, from about 2 to about 80 weight percent, from about 10 to about 70 weight percent, or about 50 weight percent based on a total solids, and the polybenzimidazole can be present in an amount of from about 99 to about 1 weight percent, from about 95 to about 1 weight percent, from about 80 to about 2 weight percent, from about 70 to about 10 weight percent, from about 75 to about 25 weight percent, from about 60 to about 40 weight percent, or about 50 weight percent based on the total solids.

Filler

Optionally, the intermediate transfer member may contain one or more fillers. For example, a conductive filler can be included to alter and adjust the conductivity of the intermediate transfer member. When the intermediate transfer member is a one layer structure, the conductive filler can be included in the polymer layer along with and dispersed in the mixture of the polyimide and the polybenzimidazole. However, where the intermediate transfer member is a multi-layer structure, the conductive filler can be included in one or more layers of the member, such as in the supporting substrate, together with being present and dispersed in the polyimide and the polybenzimidazole mixture.

Any suitable filler can be used that will provide the desired results. For example, suitable fillers include carbon black, a metal oxide, a polyaniline, other known suitable fillers, and mixtures of fillers. The filler can be present in an amount of from about 1 to about 60 weight percent, from about 3 to about 40 weight percent, from about 4 to about 30 weight percent, from about 10 to about 30 percent, from about 8 to about 20 weight percent, from about 10 to about 18 weight percent, or from about 5 to about 20 weight percent based on the total solids.

Examples of carbon black fillers that can be selected for the intermediate transfer members, and where the particle sizes thereof can be determined by an electron microscope, and the B.E.T. surface areas can be determined by the standard known one point nitrogen gas physisorption method, include VULCAN® carbon blacks, REGAL® carbon blacks, MONARCH® carbon blacks, and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); Channel carbon blacks available from Evonik-Degussa; Special Black 4 (B.E.T. surface area=180 m$^2$/g, DBP absorption=1.8 ml/g, primary particle diameter=25 nanometers), Special Black 5 (B.E.T. surface area=240 m$^2$/g, DBP absorption=1.41 ml/g, primary particle diameter=20 nanometers), Color Black FW1 (B.E.T. surface area=320 m$^2$/g, DBP absorption=2.89 ml/g, primary particle diameter=13 nanometers), Color Black FW2 (B.E.T. surface area=460 M$^2$/g, DBP absorption=4.82 ml/g, primary particle diameter=13 nanometers), and Color Black FW200 (B.E.T. surface area=460 m$^2$/g, DBP absorption=4.6 ml/g, primary particle diameter=13 nanometers). Other known suitable carbon blacks not specifically disclosed herein may be selected as the conductive component for the intermediate transfer member disclosed herein.

Examples of the polyaniline fillers that can be selected for incorporation into the disclosed intermediate transfer members are PANIPOL™ F, commercially available from Panipol Oy, Finland, and known lignosulfonic acid grafted polyanilines. The polyanilines usually have a relatively small particle size diameter of, for example, from about 0.5 to about 5 microns, from about 1.1 to about 2.3 microns, or from about 1.5 to about 1.9 microns.

Metal oxide fillers that can be selected for the disclosed intermediate transfer members include, for example, tin oxide, antimony doped tin oxide, indium oxide, indium tin oxide, zinc oxide, and titanium oxide, and the like.

Optional Polymer Binder

In embodiments of the present disclosure, the intermediate transfer members illustrated herein can further include an optional additional polymeric binder. The additional polymeric binder can be included in the mixture of the polyimide and polybenzimidazole. Examples of suitable additional polymeric binders include a polycarbonate, a polyphenylene sulfide, a polyamide, a polysulfone, a polyetherimide, a polyamideimide, a polyester, a polyvinylidene fluoride, a polyethylene-co-polytetrafluoroethylene, and the like, and mixtures thereof.

When an additional polymeric binder is added to the mixture of the polyimide and the polybenzimidazole, it can be included in any desirable and effective amounts. For example, the additional polymeric binder can be present in an amount of from about 1 to about 25 weight percent, from about 1 to about 15 weight percent, or from about 1 to about 10 weight percent, based on the total solids.

Supporting Substrate

An optional supporting substrate can be included in the intermediate transfer member, such as beneath the mixture of the polyimide and the polybenzimidazole containing layer.

The supporting substrate can be included to provide increased rigidity or strength to the disclosed intermediate transfer members. When a supporting substrate is used, a metal or glass substrate described herein can be replaced by the supporting substrate material, or the supporting substrate can first be formed on the metal or glass substrate followed by forming the mixture of the polyimide and the polybenzimidazole on the supporting substrate, and prior to removing the completed product or film from the metal or glass substrate.

The coating dispersion of the mixture of the polyimide and the polybenzimidazole can be deposited on any suitable supporting substrate material to form a dual layer intermediate transfer member. Exemplary supporting substrate materials include polyimides, polyetherimides, mixtures thereof, and the like.

More specifically, examples of the intermediate transfer member supporting substrates are thermosetting polyimide polymers, such as VTEC™ PI 1388, 080-051, 851, 302, 203, 201, and PETI-5, all available from Richard Blaine International, Incorporated, Reading, Pa.; polyetherimides, like PYRE M.L® RC-5019, RC 5057, RC-5069, RC-5097, RC-5053, and RK-692, all commercially available from Industrial Summit Technology Corporation, Parlin, N.J.; RP-46 and RP-50, both commercially available from Unitech LLC, Hampton, Va.; DURIMIDE® 100, commercially available from FUJIFILM Electronic Materials U.S.A., Inc., North Kingstown, R.I.; KAPTON® HN, VN and FN, all commercially available from E.I. DuPont, Wilmington, Del.; VYLOMAX® HR-11NN (15 weight percent solution in N-methylpyrrolidone, $T_g$=300° C., and $M_w$=45,000), HR-12N2 (30 weight percent solution in N-methylpyrrolidone/xylene/methyl ethyl ketone=50/35/15 weight percent, $T_g$=255° C., and $M_w$=8,000), HR-13NX (30 weight percent solution in N-methylpyrrolidone/xylene=67/33 [wt. percent], $T_g$=280° C., and $M_w$=10,000), HR-15ET (25 weight percent solution in ethanol/toluene=50/50 [wt. percent],$T_g$=260° C., and $M_w$=10,000), HR-16NN (14 weight percent solution in N-methylpyrrolidone, $T_g$=320° C., and $M_w$=100,000), all commercially available from Toyobo Company of Japan; and TORLON® AI-10 ($T_g$=272° C.), commercially available from Solvay Advanced Polymers, LLC, Alpharetta, Ga.

Further examples of specific polyetherimide supporting substrates that can be selected for the intermediate transfer members disclosed herein are ULTEM® 1000 ($T_g$=210° C.), 1010 ($T_g$=217° C.), 1100 ($T_g$=217° C.), 1285, 2100 ($T_g$=217° C.), 2200 ($T_g$=217° C.), 2210 ($T_g$=217° C.), 2212 ($T_g$=217° C.), 2300 ($T_g$=217° C.), 2310 ($T_g$=217° C.), 2312 ($T_g$=217° C.), 2313 ($T_g$=217° C.), 2400 ($T_g$=217° C.), 2410 ($T_g$=217° C.), 3451 ($T_g$=217° C.), 3452 ($T_g$=217° C.), 4000 ($T_g$=217° C.), 4001 ($T_g$=217° C.), 4002 ($T_g$=217° C.), 4211 ($T_g$=217° C.), 8015, 9011 ($T_g$=217° C.), 9075, and 9076, all commercially available from Sabic innovative Plastics.

Once formed, the supporting substrate can have any desired and suitable thickness. For example, the supporting substrate can have a thickness of from about 10 to about 300 microns, from about 75 to about 225 microns, from about 50 to about 150 microns, or from about 75 to about 125 microns.

Optional Release Layer

In embodiments, the intermediate transfer member may further include an optional outer release layer usually present on top of the polymer layer. The release layer can be included, for example, to alter the surface characteristics of the intermediate transfer member to allow easier and quick release of toner material from the intermediate transfer member.

Exemplary materials that are suitable for use in the disclosed intermediate transfer member release layer include TEFLON®-like materials including fluorinated ethylene propylene copolymer (FEP), polytetrafluoroethylene (PTFE), polyfluoroalkoxypolytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., (polydimethylsiloxane/dibutyl tin diacetate, 0.45 gram DBTDA per 100 grams polydimethylsiloxane rubber mixture, with a molecular weight $M_w$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomers can be those available from E.I. DuPont de Nemours, Inc., such as 4-bromoperfluorobutene-1,1,1 dihydro-4-bromoperfluorobutene-1,3-bromoperfluoropropene-1,1,1-dihydro-3-bromoperfluoropropene-1, or any other suitable, known commercially available cure site monomers.

The release layer may be deposited on the polyimide and the polybenzimidazole mixture layer by any known coating processes. Known methods for forming the outer release layer include dipping, spraying, such as by multiple spray applications of very thin films, casting, flow-coating, web-coating, roll-coating, extrusion, molding, or the like.

The disclosed intermediate transfer members are, in embodiments, weldable. That is, opposite ends of the formed film can be welded together, such as by ultrasonic welding, to produce a seam. The surface resistivity of the disclosed intermediate transfer member is, for example, from about $10^9$ to about $10^{13}$ ohm/square, or from about $10^{10}$ to about $10^{12}$ ohm/square. The sheet resistivity of the intermediate transfer weldable member is, for example, from about $10^9$ to about $10^{13}$ ohm/square, or from about $10^{10}$ to about $10^{12}$ ohm/square.

Intermediate Transfer Member Formation

The polyimide and the polybenzimidazole mixture components and the optional filler can be formulated into an intermediate transfer member by any suitable method. For example, with known milling processes, uniform dispersions of the intermediate transfer member mixture can be obtained, and then coated on individual metal substrates, such as a stainless steel substrate, glass plates, or the like, using a known draw bar coating method. The resulting individual film or films can be cured and dried, such as by heating at from about 100° C. to about 250° C., or from about 150° C. to about 220° C., for a suitable period of time, such as from about 20 to about 120 minutes, or from about 40 to about 60 minutes, while remaining on the substrate. After drying and cooling to room temperature, about 23° C. to about 25° C., the films resulting can be removed from the substrates by known processes, such as by hand peeling. The resultant films can have a thickness of, for example, from about 15 to about 150 microns, from about 20 to about 100 microns, from about 40 to about 80 microns, or from about 25 to about 75 microns.

As metal substrates selected for the deposition of the polyimide, and the polybenzimidazole containing mixture and filler or fillers disclosed herein, there can be selected stainless steel, aluminum, nickel, copper, and their alloys, or other conventional materials. Other suitable substrates that can be used include glass plates, and the like.

Examples of solvents selected for formation of the polyimide, the polybenzimidazole, and optional filler component, which solvents can be selected in an amount of from about 60 to about 95 weight percent, or from about 70 to about 90 weight percent of the total solids coating dispersion include alkylene halides such as methylene chloride, tetrahydrofuran, toluene, monochlorobenzene, N-methyl-2-pyrrolidone, N,N-dimethylformamide, N,N-dimethylacetamide, methyl ethyl ketone, methyl isobutyl ketone, mixtures thereof, and the like.

The intermediate transfer members illustrated herein can be selected for a number of printing and copying systems, inclusive of xerographic printing systems. For example, the disclosed intermediate transfer members can be incorporated into a multi-imaging xerographic machine where each developed toner image to be transferred is formed on the imaging or photoconductive drum at an image forming station, and where each of these images is then developed at a developing station, and transferred to the intermediate transfer member. The images may be formed on a photoconductor and developed sequentially, and then transferred to the intermediate transfer member. In an alternative method, each image may be formed on the photoconductor or photoreceptor drum, developed, and then transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

Specific embodiments will now be described in detail. These examples are intended to be illustrative, and are not limited to the materials, conditions, or process parameters set forth in these embodiments. All parts are percentages by weight of total solids unless otherwise indicated.

COMPARATIVE EXAMPLE 1

86 Weight percent of the polyamic acid of pyromelliticdianhydride/4,4-oxydianiline (polyimide precursor), PYRE-ML® RC5083 (about 18 to 19 weight percent in the solvent mixture of NMP/DMAc, 15/85 weight percent) as obtained from Industrial Summit technology Corp., Parlin, N.J., was mixed with 14 weight percent of the carbon black 4 (B.E.T. surface area of 180 $m^2$/g, DBP absorption of 1.8 ml/g, primary particle size diameter of 25 nanometers) as obtained from Evonik-Degussa, and an appropriate amount of the solvent, NMP, thereby adjusting the total solid content to about 17 weight percent, followed by ball milling the resulting mixture with 2 millimeter stainless shot with an Attritor for 1 hour.

The resulting dispersion containing the above formed thermosetting polyimide was then coated on a stainless steel substrate of a thickness of 0.5 millimeter using the known draw bar coating method, and subsequently dried at 125° C.

for 20 minutes, at 190° C. for 40 minutes, and at 320° C. for 60 minutes while remaining on the steel substrate.

The obtained dried coating was removed by hand peeling from the stainless steel substrate, and an about 100 micron thick intermediate transfer member film resulted where the weight ratio of the thermoset polyimide/carbon black was 86/14 weight percent based on the above initial mixture amounts.

EXAMPLE I 12.04 Weight percent of the thermoplastic polyimide P84 as obtained from HP Polymers Incorporated, with a $T_g$ of about 300° C., and a weight average molecular weight, $M_w$ of 45,000, which polyimide is of the formula/structure that follows

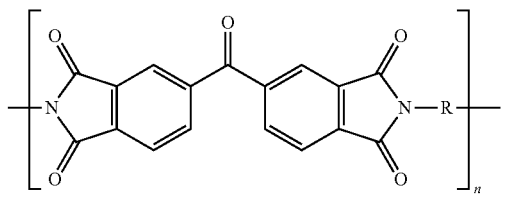

where R is phenyl and n is a number to arrive at a $M_w$ of 45,000, and 5.16 weight percent of the polybenzimidazole (PBI) Celazole® (a 26 weight percent solution in N,N'-dimethylacetamide, glass transition temperature ($T_g$) of 399° C., as determined by known DSC analysis and with a weight average molecular weight, $M_w$ of 30,000) as obtained from Boedeker Plastics, Incorporated Shiner, Tex., which PBI is of the following formula/structure and n is a number to arrive at a $M_w$ of about 60,000

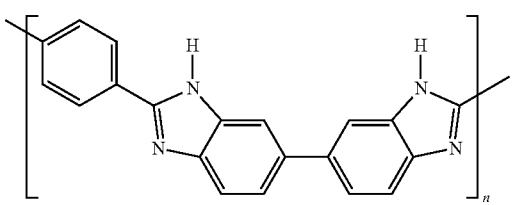

were mixed with 2.8 weight percent of carbon black 4 (B.E.T. surface area of 180 m²/g, DBP absorption of 1.8 ml/g, primary particle size diameter of 25 nanometers) as obtained from DeGussa Chemicals, and 80 weight percent of N-methylpyrrolidone, followed by ball milling with 2 millimeter stainless shot in an Attritor for a period of 1 hour. The unit price of the P84 thermoplastic polyimide is only about ⅕ of that of the Comparative Example 1 conventional thermosetting polyimide PYRE-ML® RC5083.

The above resulting dispersion was then coated on a stainless steel substrate of a thickness of 0.5 millimeter using a known draw bar coating method, and subsequently cured and dried at 190° C. for 60 minutes while remaining on the steel substrate.

The obtained dried coating was removed by hand peeling from the stainless steel substrate, and an about 80 micron thick intermediate transfer member film resulted where the weight ratio of the above thermoplastic polyimide/PBI/carbon black was 60.2/25.8/14 based on the above initial mixture feed amounts.

The above prepared intermediate transfer member had a resistivity of about $4.4 \times 10^{10}$ ohm/sq, a Young's Modulus of about 3,900 MPa, and a CTE of about 51 ppm/k, as compared to the CTE for the Comparative Example 1 thermosetting polyimide member of from about 30 to about 45 ppm/k. Also, when compared with the costly thermoset polyimide curing process (2 hours at a final curing temperature of about 320° C.), the disclosed thermoplastic polyimide/PBI blend ITB was cured at 190° C. for 1 hour, thus significantly reducing the manufacturing cost and cycle time.

EXAMPLE II

Intermediate transfer members are prepared by repeating the process of Example I except that there is selected as the thermoplastic polyimide at least one of the following structures/formulas

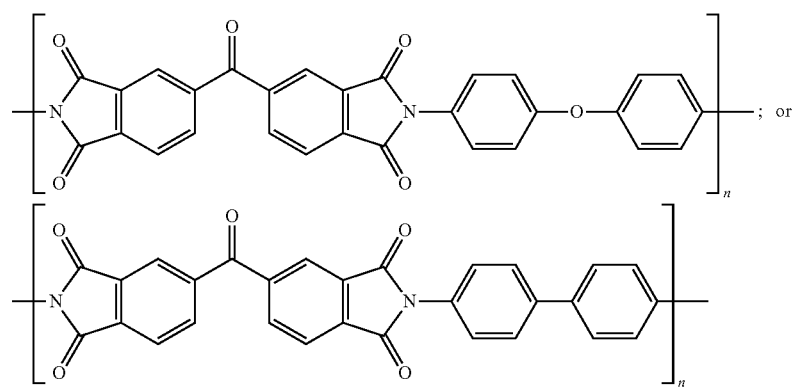

where n is from about 100 to about 375.

The above resulting dispersions are then coated on stainless steel substrates of a thickness of 0.5 millimeter using the known draw bar coating method, and the resulting coatings are subsequently dried at 125° C. for 20 minutes, and then dried at 190° C. for an additional 40 minutes while remaining on the steel substrates.

Surface Resistivity Measurement

The above intermediate transfer members of Example I and Comparative Example 1 were measured for surface resistivity (averaging four to six measurements at varying locations of the members, 72° F./50 percent relative humidity) using a High Resistivity Meter (Hiresta-Up MCP-HT450 available from Mitsubishi Chemical Corp.). The results are provided in Table 1.

TABLE 1

|  | Surface Resistivity (ohm/square) | Young's Modulus (MPa) |
| --- | --- | --- |
| Example I, Thermoplastic Polyimide/PBI/Carbon Black = 60.2/25.8/14 ITB | 4.4 × 10^10 | 3,900 |
| Comparative Example 1, Thermoset Polyimide/Carbon Black = 86/14 ITB | 4.1 × 10^10 | 3,600 |

Both the Comparative Example 1 and Example I ITB devices were functional with a surface resistivity within the range of from about $10^9$ to about $10^{13}$ ohm/square.

Young's Modulus Measurement

The above intermediate transfer members of Comparative Example 1 and Example I were measured for Young's modulus following the known ASTM D882-97 process. Samples of the intermediate transfer members of Comparative Example 1 and Example I (0.5 inch×12 inch) were placed in the Instron Tensile Tester measurement apparatus, and then elongated at a constant pull rate until breaking. During this time, there was recorded the resulting load versus the sample elongation. The modulus was calculated by taking any point tangential to the initial linear portion of this curve and dividing the tensile stress by the corresponding strain. The tensile stress was calculated by the load divided by the average cross sectional area of each of the test samples. The results are also provided in Table 1.

The Young's modulus of the Example I intermediate transfer member was measured to be about 3,900 MPa (Mega Pascals), while that of the Comparative Example 1 intermediate transfer member was about 3,600 MPa. The disclosed thermoplastic polyimide/PBI ITB of Example I possessed an improved and higher Young's modulus than the thermosetting polyimide member of Comparative Example 1.

Also, the preparation of the intermediate transfer member of Example I was accomplished at lower cost, about 50 percent less costs, due primarily to its shorter drying time (1 hour for Example I, versus 2 hours for Comparative Example 1), and lower drying temperature (190° C. for Example I versus a final curing at 320° C. for Comparative Example 1).

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of said member that has transferred thereto a developed xerographic image from a photoconductor and wherein said member consists of a mixture of a carbon black filler, a thermoplastic polyimide and a polybenzimidazole and wherein said thermoplastic polyimide is represented by the following formulas/structures wherein R is phenyl and wherein n is from about 100 to about 1,000

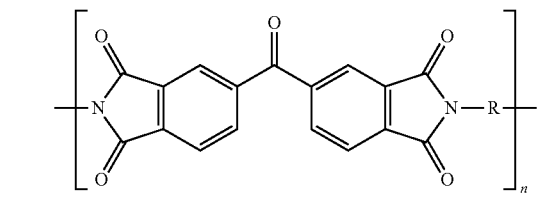

and an optional release layer.

2. An intermediate transfer member in accordance with claim 1 wherein said n is a number to arrive at a weight average molecular weight of about 45,000.

3. An intermediate transfer member in accordance with claim 1 wherein said polybenzimidazole is represented by the following formulas/structure wherein n is a number of from about 30 to about 500

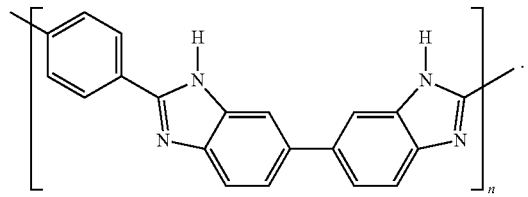

4. An intermediate transfer member in accordance with claim 3 wherein n is a number to arrive at a weight average molecular weight of about 60,000 and wherein said polybenzimidazole is present in an amount of about 5 weight percent.

5. An intermediate transfer member in accordance with claim 1 wherein said polyimide is present in an amount of from about 1 to about 95 weight percent, said polybenzimidazole is present in an amount of from about 1 to about 95 weight percent, said carbon black is present in an amount of from about 4 to about 30 weight percent of the total solids.

6. An intermediate transfer member in accordance with claim 1 wherein said thermoplastic polyimide is present in an amount of from about 2 to about 80 weight percent, said polybenzimidazole is present in an amount of from about 2 to about 80 weight percent, and said carbon black is present in an amount of from about 8 to about 20 weight percent of the total solids.

7. An intermediate transfer member in accordance with claim 1 wherein said thermoplastic polyimide is present in an amount of from about 10 to about 70 weight percent, said polybenzimidazole is present in an amount of from about 10 to about 70 weight percent, and said carbon black is present in an amount of from about 10 to about 18 weight percent of total solids.

8. An intermediate transfer member in accordance with claim 1 wherein said member has a Young's Modulus of from about 3,000 to about 8,500 Mega Pascals, and a coefficient of thermal expansion of from about 15 to about 55 ppm/K.

9. An intermediate transfer member in accordance with claim 1 wherein said thermoplastic polyimide has a number average molecular weight of from about 5,000 to about 50,000, and a weight average molecular weight of from about 10,000 to about 200,000, said polybenzimidazole has a number average molecular weight of from about 3,000 to about 40,000, and a weight average molecular weight of from about 9,000 to about 150,000, and said member has a resistivity of from about $10^8$ to about $10^{13}$ ohm/square.

10. An intermediate transfer member in accordance with claim 1 wherein said thermoplastic polyimide has a number average molecular weight of from about 10,000 to about 25,000, and a weight average molecular weight of from about 50,000 to about 150,000, and said polybenzimidazole has a number average molecular weight of from about 9,000 to about 15,000, and a weight average molecular weight of from about 20,000 to about 120,000.

11. An intermediate transfer member in accordance with claim 1 wherein said outer release layer is present and is positioned on said mixture of said thermoplastic polyimide and said polybenzimidazole, wherein said release layer is selected from the group consisting of a fluorinated ethylene propylene copolymer, a polytetrafluoroethylene, a polyfluoroalkoxypolytetrafluoroethylene, a fluorosilicone, a terpolymer of vinylidene fluoride, hexafluoropropylene, and tetrafluoroethylene, and mixtures thereof.

12. An intermediate transfer member in accordance with claim 1 wherein said polybenzimidazole is represented by the following formulas/structures

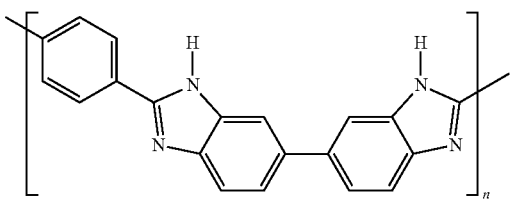

wherein n represents the number of repeating segments of from about 10 to about 800.

13. An intermediate transfer member in accordance with claim 12 wherein n is a number of from about 200 about 700.

14. An intermediate transfer member in accordance with claim 12 wherein n is a number of from about 30 to about 500.

15. An intermediate transfer member in accordance with claim 12 wherein n is a number of from about 100 to about 300.

16. An intermediate transfer member consisting of a photoconductor containing a developed xerographic image thereon and which image is transferred to said member consisting of a mixture of a conductive filler of carbon black, a thermoplastic polyimide and a polybenzimidazole, wherein said thermoplastic polyimide is selected from the group consisting of those represented by the following formulas/structures wherein R is phenyl and n is from about 100 to about 1,000

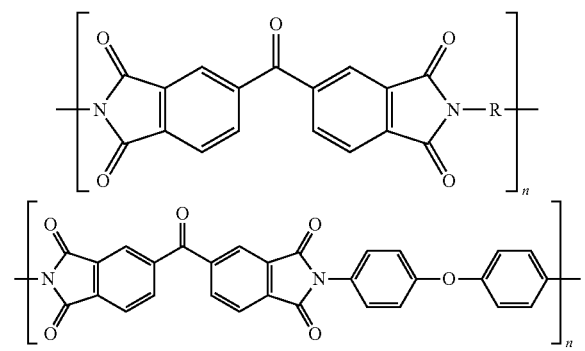

and

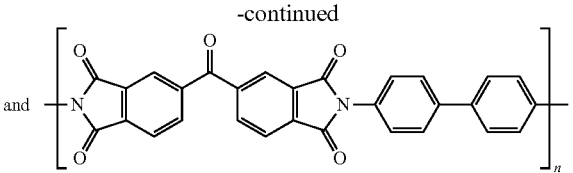

and wherein said polybenzimidazole is represented by the following formulas/structures

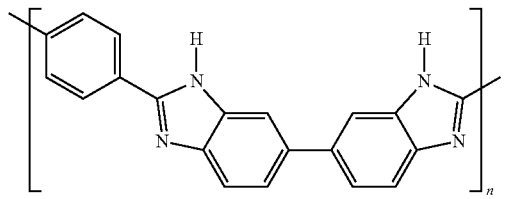

wherein n represents the number of repeating segments of from about 30 to about 500 and wherein said member has a Young's Modulus of from about 3,000 to about 8,500 Mega Pascals, and a coefficient of thermal expansion of from about 15 to about 55 ppm/K.

17. An intermediate transfer member in accordance with claim 16 wherein n of the polybenzimidazole is from about 100 to about 400, and where said polybenzimidazole has a glass transition temperature of from about 380° C. to about 420° C.

18. An abrasion resistant xerographic intermediate transfer member consisting of a mixture of a thermoplastic polyimide, a polybenzimidazole, and an optional carbon black conductive filler, and wherein said member possesses a Young's Modulus of from about 3,500 to about 6,500 Mega Pascals and a coefficient of thermal expansion of from about 25 ppm/K to about 55 ppm/K and wherein said thermoplastic polyimide is represented by

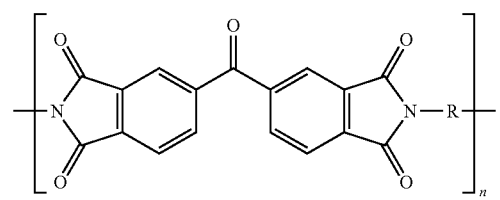

wherein R is phenyl and n is the number of the repeating units wherein n is a number of from about 100 to about 300 and wherein said polybenzimidazole is represented by the following formulas/structures

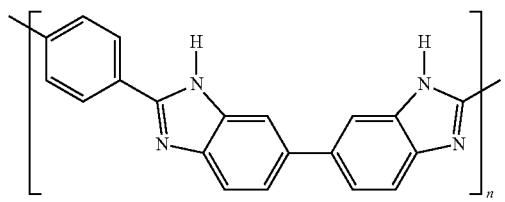

wherein n represents the number of repeating segments of from about 30 to about 500.

* * * * *